United States Patent [19]

Grove et al.

[11] 3,746,303

[45] July 17, 1973

[54] VALVE CONSTRUCTION AND METHOD

[75] Inventors: Marvin H. Grove; Kee W. Kim, both of Houston, Tex.

[73] Assignees: M & J Valve Company; M & J Development Company, Houston, Tex.

[22] Filed: Mar. 9, 1970

[21] Appl. No.: 17,365

Related U.S. Application Data

[63] Continuation-in-part of Ser. Nos. 679,138, Oct. 30, 1967, abandoned, and Ser. No. 773,785, Nov. 6, 1968, abandoned.

[52] U.S. Cl................. 251/159, 251/363, 251/317
[51] Int. Cl.......................... F16k 25/00, F16k 5/06
[58] Field of Search................... 251/315, 359, 364, 251/328, 333, 159, 193, 363, 317

[56] References Cited
UNITED STATES PATENTS

| | | | |
|---|---|---|---|
| 2,745,631 | 5/1956 | Shellman | 251/333 X |
| 2,778,598 | 1/1957 | Bolling, Jr. | 251/333 X |
| 3,186,430 | 6/1965 | Koutnik | 251/333 X |
| 3,235,224 | 2/1966 | Grove | 251/328 X |
| 3,401,915 | 9/1968 | Kim | 251/328 X |
| 3,504,886 | 4/1970 | Hulslander et al. | 251/328 X |
| 2,055,512 | 9/1936 | Wallace | 251/364 |
| 2,861,773 | 11/1958 | Clade | 251/315 |
| 3,108,779 | 10/1963 | Anderson | 251/315 X |
| 3,210,042 | 10/1965 | Freeman | 251/315 X |
| 3,306,315 | 2/1967 | Cook | 251/315 X |
| 3,447,781 | 6/1969 | Fawkes | 251/315 |

FOREIGN PATENTS OR APPLICATIONS

140,041  4/1953  Sweden................... 251/315

*Primary Examiner*—Samuel Scott
*Attorney*—Flehr, Hohbach, Test, Albritton & Herbert

[57] ABSTRACT

A valve (e.g., gate or ball) having a sealing assembly with one part made of material like nylon and a second part made of a more resilient material such as a synthetic rubber. The two parts are press fitted into an annular recess and provide finished sealing surfaces for engaging the valve working surface of a gate or other valve member. In one embodiment the more resilient material is disposed adjacent one peripheral surface of the nylon. In another embodiment the more resilient material is disposed adjacent both inner and outer peripheries of the nylon. Also a method of manufacture in which sealing surfaces are formed after the two parts have been pressed into the recess.

8 Claims, 12 Drawing Figures

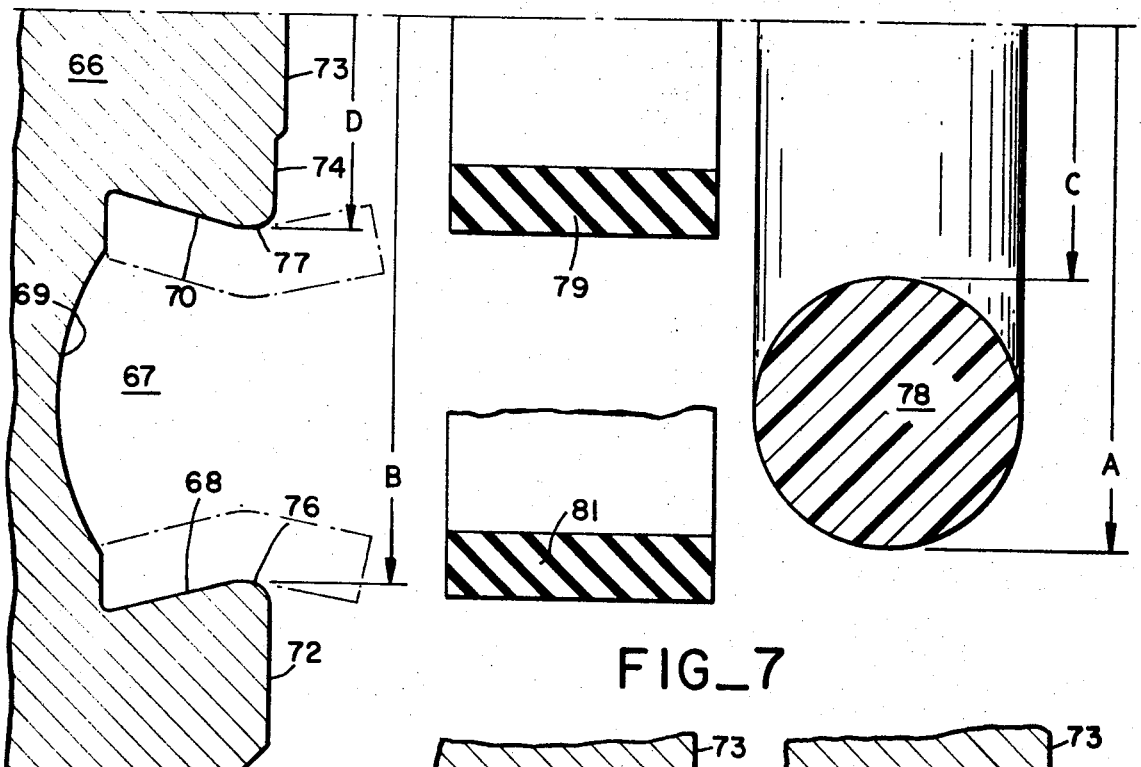
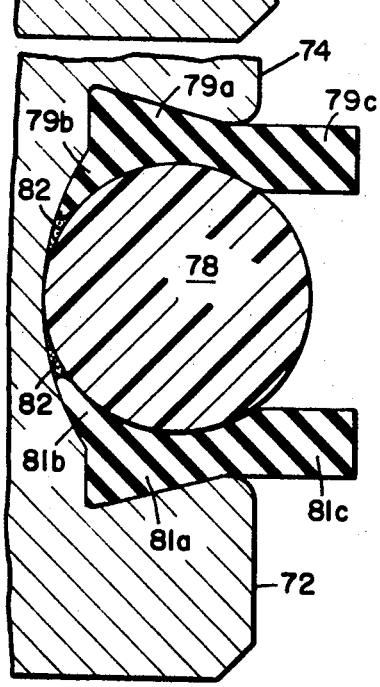
FIG_8
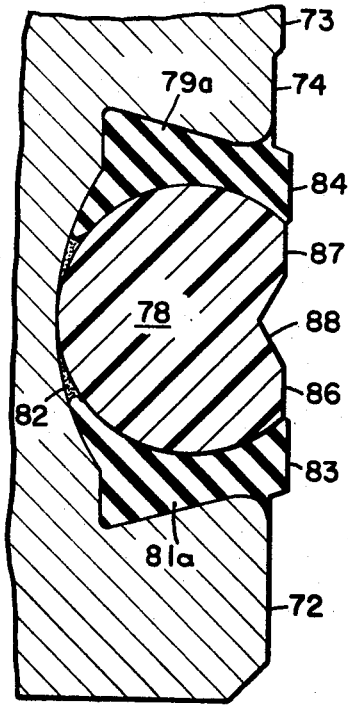
FIG_9
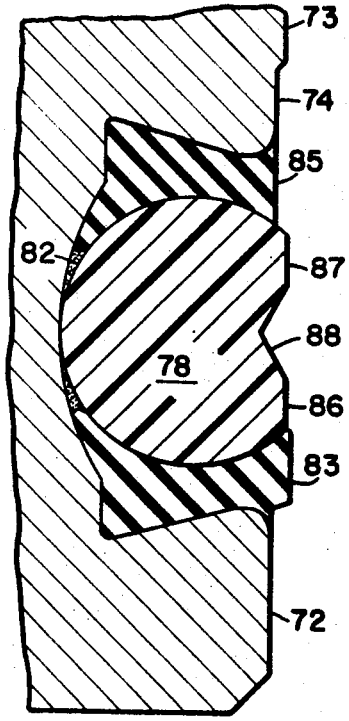
FIG_10

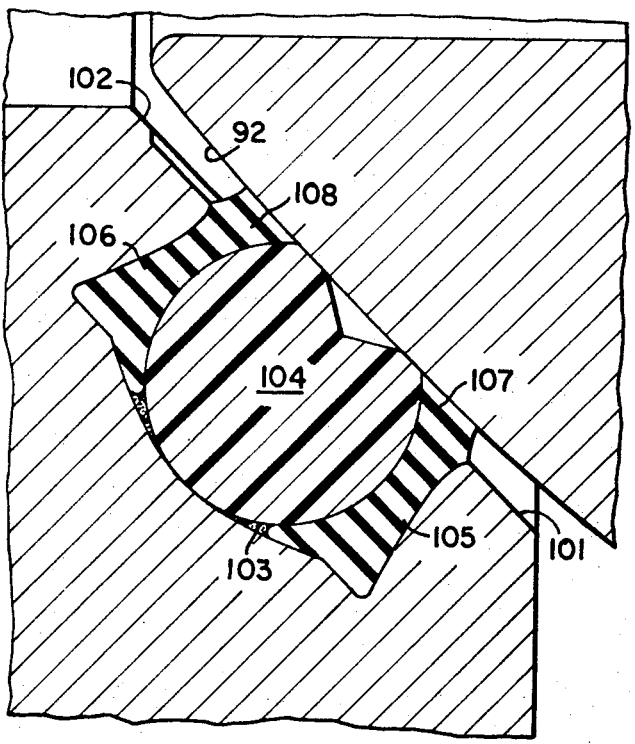
FIG_12
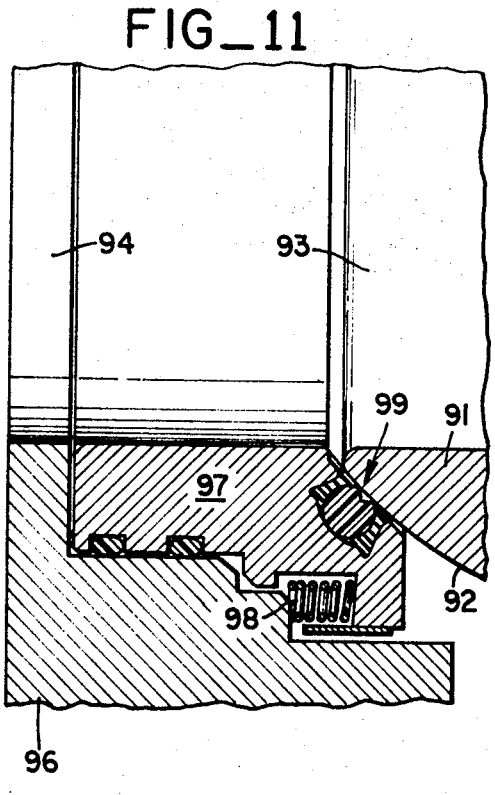
FIG_11

VALVE CONSTRUCTION AND METHOD

CROSS-REFERENCE TO RELATED APPLICATIONS

This application is a continuation-in-part of our application Ser. No. 679,138 filed Oct. 30, 1967 (now abandoned) and our copending application Ser. No. 773,785 filed Nov. 6, 1968 and now abandoned.

BACKGROUND OF THE INVENTION

In the past many valves of the gate, ball or plug types have employed sealing assemblies having members made of non-metallic resilient material like nylon, Teflon, Kel-F, various elastomers and natural or synthetic rubber. Particular reference can be made to U.S. Pat. No. 3,269,695 showing a nylon seal ring having an insert of a more resilient material and with the nylon ring being secured to a metal carrier ring. The nylon ring with its carrier ring is spring pressed toward the valve working surface of the gate or other valve member. Such a sealing asembly is satisfactory for a variety of services. However, it is relatively expensive to manufacture due to the size and form of the nylon ring and because of the operations required to mold the rubber insert into the nylon. Also when made in the larger sizes such assemblies do not have the desired stiffness and tend to be distorted with loss of sealing effectiveness.

BRIEF SUMMARY OF THE INVENTION

This invention relates generally to valves for controlling fluid flow and methods for their manufacture.

In general it is an object of the present invention to provide a valve having a sealing assembly which includes two different types of non-metallic resilient material such as nylon and a synthetic rubber, and which is relatively inexpensive to manufacture.

Another object of the invention is to provide a valve having a sealing assembly of the above character so constructed that it does not require a rubber molding or curing operation.

Another object of the invention is to provide a valve having a sealing assembly of the above character so constructed that it can be made of standard stock materials, such as a nylon rod or bar and sheet rubber.

Another object is to provide a sealing assembly which is suitable for valves made in the larger sizes (e.g., valves of 30 – 40 inch pipe size).

Another object is to provide a simple and effective method for manufacturing the sealing assembly.

The invention is incorporated in a valve which includes a body having aligned flow passages and a valve member within the body movable between open and closed positions. The sealing assemblies each consist of a rigid annular seat member carried by the body and sealed with respect to the same. A portion of the seat member near the valve member has an annular recess which accommodates an annular ring of material like nylon, and at least one more resilient compressed annulus. The nylon ring and the more resilient material provide resilient annular sealing surfaces that contact and make sealing engagement with the valve member. The method involves positioning the materials into the recess in a particular manner followed by machining.

Additional objects and features of the invention will appear from the following description in which the preferred embodiment has been set forth in detail in conjunction with the accompanying drawing.

BRIEF DESCRIPTION OF THE DRAWING

FIG. 7 is an exploded view in section like FIG. 3 but showing another embodiment of the invention;

FIG. 8 is a detail in section illustrating the parts of FIG. 7 after assembly and indicating rubber portions to be trimmed away;

FIG. 9 is a detail in section like FIG. 8, and showing rubber trimmed away to provide a double seal;

FIG. 10 is a detail in section like FIG. 8, but showing the rubber trimmed away to provide a single seal;

FIG. 11 is a detail in section illustrating the invention incorporated in a valve of the ball type;

FIG. 12 is an enlarged detail in section showing the sealing assembly incorporated in FIG. 11.

DESCRIPTION OF THE PREFERRED EMBODIMENTS

Figure 1:
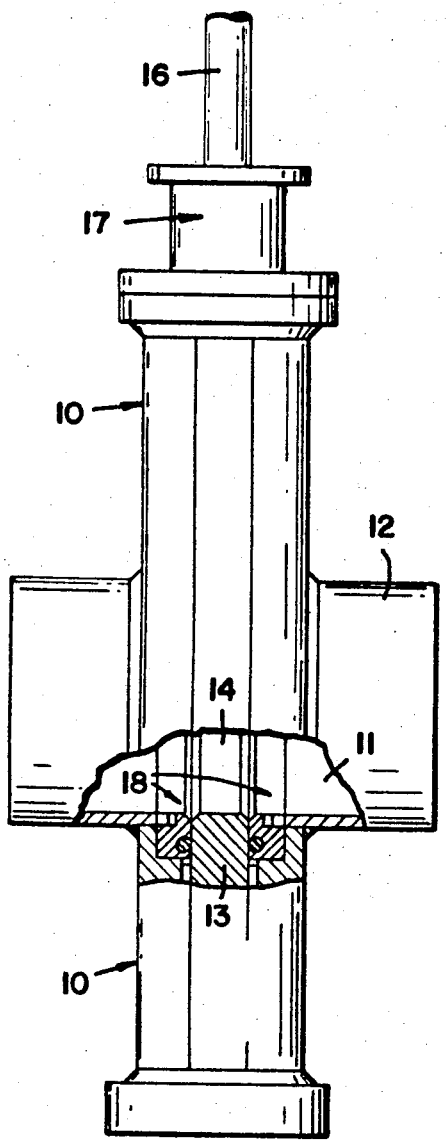
FIG. 1 is a side elevational view, partly in section, illustrating a gate valve incorporating one embodiment of the invention.

The gate valve illustrated in FIG. 1 consists of a body 10 having aligned flow passages 11 which are adapted for making connection with hubs 12 or associated piping. Within the body there is a flat gate 13 which in this instance is provided with a port 14 that registers with the flow passages for full open position of the valve. The gate at its upper end is attached to an operating rod 16 which extends to the exterior of the valve through the bonnet assembly 17. Annular sealing assemblies are indicated schematically at 18, and they are carried by the end walls of the valve body. The sealing assemblies surround the flow passages 11 for closed position of the valve, and they establish fluid tight seals between the body and the adjacent valve working surface of the gate.

Figure 2:
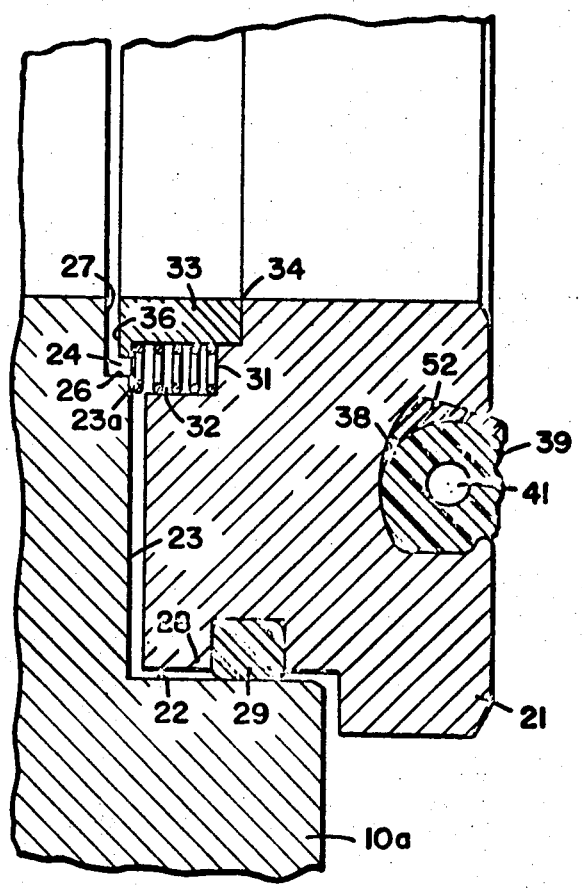
FIG. 2 is an enlarged detail in section illustrating one of the sealing assemblies incorporated in FIG. 1.

FIG. 2 illustrates one of the sealing assemblies, and the manner in which the assembly is carried by the valve body. Particularly, a relatively rigid annular seat member 21, which can be made of suitable metal, is fitted within a recess provided in the adjacent end wall 10a of the body. The recessing of the body can be such as to provide the cylindrical surface 22 and the bottom surface 23. Also with the particular spring arrangement illustrated, it is desirable to provide additional recessing as indicated at 24, which is defined by the cylindrical surface 26 and the bottom surface 27.

The annular member 21 is formed to provide the cylindrical portion 28 which slidably interfits the cylindrical surface 22. Suitable sealing means, such as the resilient ring 29 of the O-ring type, is carried by portion 28 and establishes a fluid-tight seal between the annular seat member 21 and the body.

The particular spring arrangement illustrated consists of a plurality of compression springs 31 which are spaced circumferentially, and which are accommodated within an annular recess 32 formed in the seat member 21. The recess 32 is closed on its inner side by the retainer ring 33, which is attached to member 21 by suitable means such as the weld connection 34. In place of a weld connection other means can be used, such as a force-fit, spurs on the retainer ring to engage notches in the member 21, and the like.

Assuming that the parts are assembled without the valve gate, as illustrated in FIG. 2, the springs are held in partially compressed condition by engagement with a flange 36 extending inwardly from the retainer ring 33. When the annular member 21 is forced to the left as by engagement with a valve gate, the coil springs are further compressed because of their engagement with the shoulder 23a formed by the inner portion of the surface 23.

Figure 3:
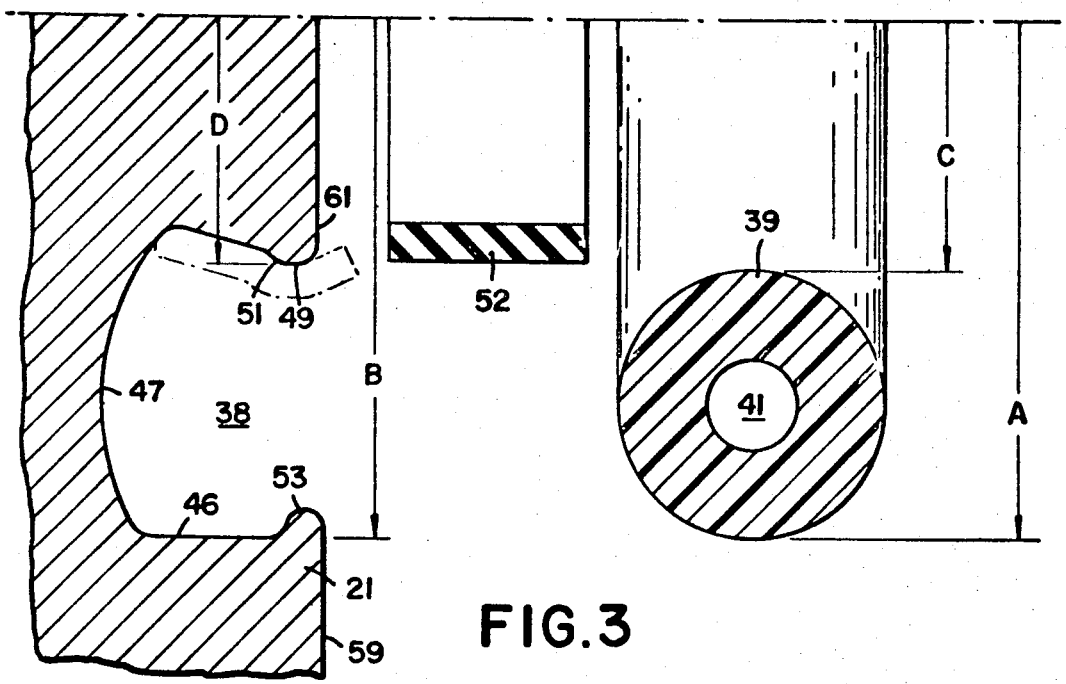
FIG. 3 is an exploded view in section, showing the various parts of the assembly and indicating the manner in which the parts are assembled to form the finished structure.

The various parts that are assembled within the annular member 21 can best be understood by reference to FIG. 3. An annular recess 38 is formed in the annular member 21, and in section it has a configuration which conforms in some respects to the configuration of the ring 39 that is accommodated therein. The ring 39 is made of a relatively hard resilient nonmetallic material such as nylon, Teflon, Kel-F or the like. For the sake of economy and simplicity, this member can be a standard nylon bar or rod bent into the form of a circle, with its ends cemented together. Such standard nylon members are frequently provided with a hollow core 41. One side of this member is formed relatively flat for engaging the gate. Thus after assembly (FIG. 4) the rod can be machined away to provide an annular projecting portion 42 having a flat annular surface 43 for contacting the valve working surface of the gate. Also an annular portion 44 provides a flat annular surface 45 that is concentric with surface 43 and in the same plane.

The recess 38 (FIG. 3) in this instance is defined by the outer cylindrical surface 46, the concave bottom surface 47, and the inner peripheral surface 48 which conforms generally to the surface of a truncated cone. In other words, in section this surface 48 converges toward the surface 46 and toward the right hand or open side of the recess. Surface 48 merges with the ridge-like surface 49 which is shown rounded and which has a diameter slightly greater than the largest diameter of the surface 48, thereby forming the annular shoulder 51.

In addition to the nylon ring 39, an annulus 52 is provided which is made of a non-metallic material that is somewhat more resilient than the nylon. For example, one can employ natural or any one of several synthetic rubbers or elastomers having a durometer hardness on the A scale ranging from 60 to 85. The nylon or other resilient material forming the ring 39 may have a durometer hardness as measured on the D scale ranging from 85 to 90. The rubber annulus 52 can be cut from flat sheet rubber stock, or it can be molded as a ribbon-like ring. Preferably it is made as a band by bonding together the ends of a resilient strip.

The outer periphery of the recess 38 is preferably machined to provide the ridge 53. As will be presently explained, this ridge aids in retaining the assembly within the recess 38.

The over-all diameter of the nylon ring 39, indicated at A, is somewhat greater than the diameter B of the surface 46. The inner diameter C of the nylon ring 39 is somewhat greater than the diameter D of the surface 49, and the radial difference between C and D is substantially less than the uncompressed thickness of the annulus 52.

Figure 4:
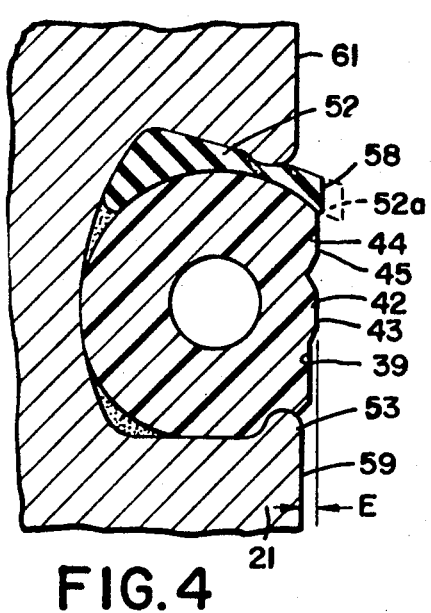
FIG. 4 is a detail in section illustrating the parts of FIG. 3 after assembly, and indicating the rubber portion which must be trimmed away.

Preparatory to an assembly operation it is desirable to heat and soften the nylon ring by immersion in boiling water. After a suitable semi-fluid bonding cement has been applied to surfaces 48 and 49, the ring 52 is stretched circumferentially and then snapped over these surfaces to assume the position shown in dotted lines in FIG. 3. Semi-fluid bonding cement is then applied to all of the exposed surfaces of the recess and to the inner periphery of ring 52. The nylon ring 39, before being machined, is forced into the recess 38 to assume the position shown in FIG. 4. Sufficient force must be applied to effect stressing and partial deformation of the nylon whereby it passes over the ridge 53 and has its inner periphery flattened in tight contact with surface 46. The ring 52 is likewise compressed and distorted by the harder nylon and assumes a form as shown in FIG. 4. Some of the bonding cement may be extruded when the nylon ring is pressed into place.

Previous reference has been made to machining one side of the nylon ring for engagement with an adjacent gate. In addition to machining the nylon ring, the excess rubber 52a which exists immediately after assembly is trimmed away by machining or grinding to provide the annular sealing surface 58. This surface is located in a plane offset slightly beyond the plane of the surfaces 43 and 45.

As shown in FIGS. 2 and 4, in the final assembly the recess space is substantially entirely occupied, thus eliminating voids. Distortion or extrusion of ring 52 occupies most of the space not occupied by the nylon and the remaining space is occupied by hardened cement.

The surface 59 of the annular member 21 under certain operating conditions (e.g., relatively high pressure differential) may be in direct abutting engagement with the adjacent valve gate. The plane of the nylon surfaces 43 and 45 when not in engagement with a gate is offset from the plane of surface 59 by the distance E. The annular surface 61 of the annular member 21 preferably is relieved with respect to the plane of the surface 59.

Figure 5:
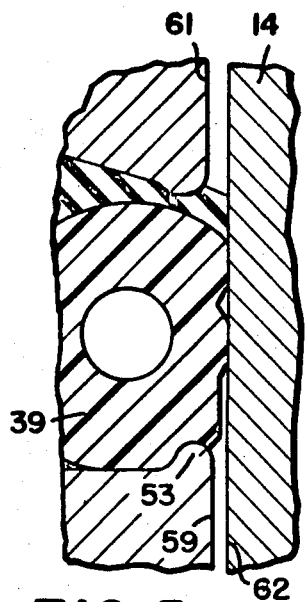
FIG. 5 is a detail like FIG. 4 but showing the assembly in juxtaposition with the valve working surface of a gate, as upon the upstream side of a gate valve.
Figure 6:
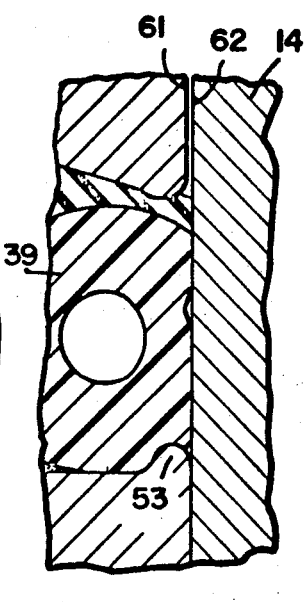
FIG. 6 is a detail in section similar to FIG. 5 but indicating the relationship between the sealing assembly and the gate on the downstream side of the valve, with pressure applied.

After a valve gate has been inserted in a valve body having the sealing assembly shown in FIG. 4, the relationship of the parts is as shown in FIG. 5. By virtue of the thrust of the compression springs 31, the nylon ring 39 is urged toward the adjacent valve working surface 62 of the gate 14, thus compressing the surface 58 of the rubber insert as illustrated in FIG. 5. In this instance the annular nylon surfaces 43 and 45 are shown in close juxtaposition or in light contact with the valve working surface 62. The resilient rubber surface 58 provides a good fluid-tight seal with the gate and in particular is effective for low differential fluid pressures. Thus low pressure seals are established on both the upstream and downstream sides of the valve. Assuming that the pressure applied to the upstream side is increased, the upstream annular member 21 tends to be urged by fluid pressure against the adjacent gate, thus tending to move the surface 59 in closer relationship with the gate. On the downstream side the thrust of the gate may be sufficient to bring the gate into direct abutting contact with the surface 59 in the manner shown in FIG.

6. Likewise such a direct abutting relationship may be established on the upstream side, if the differential pressure is sufficiently high. For the higher differential fluid pressures the surfaces 43 and 45 are pressed into effective sealing contact with the gate. Also portion 44 lends support to the adjacent portion of the rubber 52.

The invention described above has a number of desirable features. The more resilient rubber sealing surface 59 establishes good sealing contact with the valve working surface of the gate which is effective for relatively low differential pressures, and the nylon together with the rubber provide good sealing for the higher operating pressures. The rubber is protected and held in place by the nylon ring 39, thus making it possible to operate the valve between open and closed positions without undue wear or pinching of the rubber. The nylon and rubber parts are protected against any tools that may be passed through the valve and associated piping for clean-out purposes, because these parts are disposed within recesses formed in the metal annular members 21. The nylon and rubber parts are relatively inexpensive, and their assembly can be carried out without undue expense and without rubber molding or curing operations. By adequately dimensioning the ring 21 the assembly can be made with adequate stiffness for relatively large sized valves, thus facilitating assembly and promoting effective sealing.

As previously indicated, it is not necessary to use a nylon rod for forming the ring 39. Instead members of other cross-sectional configurations may be used. For example, a member can be used which in section has arcuate outer and inner peripheries, but with a flat side remote from the side that is machined to contact the gate. In such event the surface 47 of the recess is made flat rather than arcuate.

By way of example, for a 34 inch pipe diameter gate valve of the type shown in FIG. 1, the nylon rings 39 initially had a mean diameter of 34 inches and in section were three-eighths inch in diameter. Surface 46 had a diameter B of 34.42 inches and surface 49 a diameter D of 33.61 inches. The rubber 52 had an initial thickness of three thirty-seconds inch. The nylon surface 43 had a mean diameter of 34 inches and protruded in such a manner that the distance E in FIG. 4 was 0.015 inch. The rubber surface 58 had a radial width of about 0.05 inch and was offset about 0.005 inch from the plane of the surfaces 43 and 45. The offsetting between surfaces 59 and 61 was 0.01 inch. The recess 38 had a configuration in section substantially as shown in FIG. 3. The valve when assembled provided a good tight seal on both the upstream and downstream sides of the gate, over a wide range of differential pressures.

The foregoing embodiment is characterized by use of a single annulus made of rubber or other resilient material which is softer or more resilient than the member 39, which may be made of nylon. Also after trimming or machining, the assembly is such that a single fluid-tight seal is formed with the valve working surface of the associated gate or other valve member, the seal being located at the inner periphery of the ring 39.

It has been found that assembly is facilitated if two resilient annuluses are employed in place of a single annulus as previously described. A further advantage to the use of two resilient annuluses in place of one is that it makes possible a sealing assembly which can be machined to provide two seals, one adjacent the inner and the other adjacent the outer periphery of the ring, or to provide a single seal comparable to the embodiment first described.

In FIG. 7 the relatively rigid annular seat member 66 corresponds to the seat member 21 of FIG. 3. The recess 67 in this instance is defined by the outer peripheral surface 68 which is conical (i.e., frusto-conical), the bottom surface 69 which is comparable to the bottom surface 47 of FIG. 3, and the inner peripheral surface 70 which is likewise conical. In other words, peripheral surfaces 68 and 70 are formed convergent toward the open side of the recess. The annular machined surfaces 72 and 73 may be in parallel planes but slightly offset whereby when the assembly is compressed on the downstream side of the valve, surface 73 directly contacts the valve working surface of the gate. Surface 73 is relieved as indicated at 74 for a purpose to be presently described. The outer corner surfaces 76 and 77 of the recess are rounded as indicated. The ring 78, of nylon or like material, is shown without a central core opening. The resilient annulus 79 corresponds with the annulus 52 of FIG. 3. A second annulus 81 is dimensioned whereby it can be disposed upon the outer peripheral surface 68.

The parts shown in FIG. 8 are assembled as follows. A suitable cement is applied to the peripheral surfaces 68 and 70, after which the annulus 81 is laid over the surface 68 with its forward edge projecting beyond the surface 72. Annulus 79 is applied over the surface 70, and likewise has its outer edge projecting beyond the surface 73. These positions are illustrated in dotted lines in FIG. 7. Cement is then applied upon the exposed surfaces of the annuluses 79 and 81 and also over the bottom surface 69 of the recess. The nylon ring 78 is now pressed into the recess 67 until it reaches the final position shown in FIG. 8. This necessitates substantial compression of both the annuluses 79 and 81, and after reaching the final position shown in FIG. 8, these annuluses remain compressed to adequately retain the nylon ring within the recess. The configuration of the annuluses in section (FIG. 8) shows that they have been distorted by compression to conform with the adjacent surfaces of the recess, and as a result the annulus 79 has produced the main portion 79a, the extruded portion 79b, and the extending portion 79c. Similarly, distortion of annulus 81 has produced the main portion 81a, the extruded portion 81b, and the extension 81c. Any remaining voids are substantially completely filled by the cement 82.

After producing the assembly shown in FIG. 8, trimming and machining or grinding operations are carried out to produce a final sealing assembly as in FIG. 9. For a double seal this machining involves cutting away the extending portions 79c and 81c to provide the resilient sealing surfaces 83 and 84. These surfaces are in a common plane which is offset a short distance beyond the plane of surface 73. The nylon ring 78 is machined to provide annular surfaces 86 and 87 that are separated by the groove 88. Surfaces 86 and 87 are in a common plane and offset a short distance byond the plane of surface 73. In general, the amount of offsetting of surfaces 86 and 87 may be about one-half the offsetting of surfaces 83 and 84.

For a single seat the assembly of FIG. 8 is machined as shown in FIG. 10. In this instance the rubber extension 79c has been trimmed back to the surface 88 and therefore does not contact the gate surface.

The desirable features of the assemblies shown in FIGS. 9 and 10 will be evident from the foregoing. Assembly operations including particularly the insertion of the nylon ring, are facilitated, and after forming the assembly of FIG. 8, machining may provide either single or double seals.

Sealing assemblies having two concentric annular seal areas with respect to the associated valve member are desirable in certain instances. For example, when used on the upstream side of a valve, a seal is provided for differential pressures between the upstream line and body space, applied in either direction. In some instances it may be desirable to use different assemblies on the upstream and downstream sides (e.g., a double seal on the upstream and a single seal on the downstream side) or the downstream seal may be omitted. In making a single seal, the rubber annuluses may be trimmed to provide a seal at the outer periphery of the nylon seal, instead of at the inner periphery as in FIG. 2. When the sealing surface 84 is provided, the provision of offset 77 tends to prevent pinching of the rubber near sealing surface 64 when pressed against the gate.

In the process of inserting the nylon ring 78 it is desirable to provide means for venting trapped air and excess cement from the recess 38. Thus a plurality of small holes can be drilled through the ring 78 whereby when the ring is being pressed into the recess, trapped air may escape and excess cement be vented off. In the final assembly such holes (not shown) are filled with the solidified cement. Such holes may also be used in making the assembly of FIG. 2.

Although the invention has been described in connection with a valve of the gate type, it can be employed with other types of valves, including ball valves having spherical valve working surfaces, plug valves having conical or cylindrical shaped valve surfaces, and valves of the plunger type.

FIG. 11 shows parts of a ball valve. The valve member 91 in this instance is in the form of a ball having a spherical valve working surface 92 and having a transverse port opening 93 which is adapted to register with the flow passages 94 in the body 96 for open position of the valve. It is assumed that the valve body 96 is provided with trunnions for supporting the ball for turning movement about its axis, the trunnions also serving to carry the thrust of fluid pressure against the ball when the valve is in closed position. The metal seat ring 97 is fitted in the body and is shown being urged by compression springs 98 toward the valve ball 91. The details of the sealing assembly 99 carried by the seat ring 97 are shown in FIG. 12. That end portion of the seat ring 97 which is in proximity with the valve ball is machined to provide a generally spherical or conical face, including the surfaces 101 and 102 which are substantially coincident with a common cone. These surfaces are spaced a short distance from the adjacent valve working surface of the ball. Between these surfaces there is a recess 103 which in section has a configuration similar to the recess 67 shown in FIG. 7. The parts within this recess include the seal ring 104 corresponding to the seal ring 78 of FIG. 7, together with the members 105 and 106 made of more resilient material, such as a suitable synthetic rubber, and corresponding to the members 79a and 81a of FIG. 9. The faces 107 and 108 of the resilient members correspond with the faces 83 and 84 of FIG. 9, and in this instance are shown as somewhat compressed and pressing against the valve working surface 92. The face of the seal ring 104 is also shown machined off to provide surface areas for engaging the valve working surface 92, and these surface areas are likewise coincident with a cone.

The assembly of FIGS. 11 and 12 can be made in substantially the same manner as previously described in connection with FIG. 7. After assembly, both the nylon and the more resilient members are machined off substantially as shown in FIG. 9, except that they are machined to correspond to a conical or spherical surface.

We claim:

1. In a valve construction of the type including a valve body having aligned flow passages and a valve part within the body movable between open and closed positions, the valve part having at least one valve working surface, sealing means carried by the body and surrounding at least one of the flow passages for closed position of the valve, the sealing means engaging the valve working surface and forming a seal between the body and the valve member; the improvement comprising a sealing assembly forming said sealing means and consisting of an annular rigid seat member carried by the body and sealed with respect to the same, means for urging the seat member toward the valve working surface, said seat member having an annular surface on one portion of the same disposed adjacent said valve working surface, an annular recess formed in said portion of the annular member, said recess being defined by outer and inner peripheral surfaces and by a bottom surface, said peripheral surfaces being convergent toward the open side of the recess, a ring of nonmetallic resilient material fixed in said recess and having an annular face of the same disposed to contact said valve working surface, said annular face being normally offset with respect to said surface of said seat member, an annulus of non-metallic material more resilient than the material of said ring and interposed in radially compressed condition between the ring and one of said peripheral surfaces, one peripheral surface of the annulus being pressed into contact with the adjacent peripheral surface of the ring, one end portion of said annulus when relaxed having its end face normally offset from said surface of the ring and when compressed by urging the assembly against the valve working surface serving to contact and establish a seal with respect to the valve working surface, the thickness of the annulus as measured radially being relatively small compared to the radial thickness of the ring, the seal being established with respect to pressure differential applied in a direction to urge said end portion of the annulus against the ring.

2. A valve as in claim 1 having a second annulus formed of material comparable to said first named annulus and interposed in compressed condition between the ring and the other one of said peripheral surfaces.

3. A valve as in claim 1 in which the annulus is bonded to the adjacent peripheral surface of the recess.

4. A valve as in claim 1 in which said annulus is disposed adjacent the inner peripheral surface of the ring.

5. A valve as in claim 4 in which the inner peripheral defining surface of the recess is generally frustoconical, whereby the configuration of the recess in cross-section is such that it has an increasing radial width toward the bottom thereof.

6. In a valve construction of the type including a valve body having aligned flow passages and a valve member within the body movable between open and closed positions, the valve member having at least one valve working surface, and sealing means carried by the body and surrounding one of the flow passages for closed position of the valve; the improvement comprising a sealing assembly forming said sealing means and consisting of an annular seat member of rigid material carried by the body and sealed with respect to the same, said annular seat member having a surface on one portion of the same disposed adjacent said valve working surface, an annular recess formed in said portion of the annular member, said recess in cross-section being defined by outer and inner peripheral surfaces and a bottom surface, said peripheral surfaces being convergent toward the open side of the recess, a ring formed of non-metallic resilient material disposed within the recess, said ring having an annular face normally offset from the said surface of the seat member, and two radially compressed annuluses of more resilient material interposed between said ring and the inner and outer peripheral surfaces of the recess, at least one of said annuluses having an annular end sealing surface normally offset from said surface of the seat member and in sealing contact with the valve member.

7. A valve as in claim 6 in which both said annuluses have normally offset surfaces in sealing contact with the valve member, the surfaces being located adjacent the inner and outer peripheries of the ring.

8. A valve as in claim 6 in which both the inner and outer peripheral surfaces of the recess are frustoconical in section.

* * * * *